United States Patent [19]

Tauschmann

[11] Patent Number: 4,694,865
[45] Date of Patent: Sep. 22, 1987

[54] CONDUIT

[76] Inventor: Otto Tauschmann, Ostmarkgasse 23/9, Wien, Austria

[21] Appl. No.: 752,336
[22] PCT Filed: Oct. 31, 1984
[86] PCT No.: PCT/AT84/00038
    § 371 Date: Jun. 25, 1985
    § 102(e) Date: Jun. 25, 1985
[87] PCT Pub. No.: WO85/02003
    PCT Pub. Date: May 9, 1985

[30] Foreign Application Priority Data

Oct. 31, 1983 [AT] Austria ............ 3846/83

[51] Int. Cl.⁴ .................................... F16L 59/06
[52] U.S. Cl. ............................ 138/148; 138/113
[58] Field of Search ............ 138/148, 113, 114, 108, 138/111; 285/133.1, 47, 53, 138

[56] References Cited

U.S. PATENT DOCUMENTS

| | | | |
|---|---|---|---|
| 951,342 | 3/1910 | Sherwood | 138/148 |
| 2,664,112 | 12/1953 | Isenberg | 138/148 |
| 2,735,449 | 2/1956 | Grahame | 138/113 |
| 2,915,089 | 12/1959 | Horsting, Sr. | 138/148 |
| 2,930,407 | 3/1960 | Conley et al. | 138/148 |
| 3,068,026 | 12/1962 | McKamey | 285/47 |
| 3,126,918 | 3/1964 | Eaton | 138/148 |
| 3,146,005 | 8/1964 | Peyton | 138/148 |
| 3,213,889 | 10/1965 | Cotman | 285/133.1 |
| 3,275,345 | 9/1966 | Waldron | 138/148 |
| 3,371,946 | 3/1968 | Bleyle, Jr. et al. | 285/47 |
| 3,417,785 | 12/1968 | Andrews | 138/112 |
| 3,648,734 | 3/1972 | Waite et al. | 138/113 |
| 3,785,407 | 1/1974 | Waite et al. | 138/108 |
| 4,036,617 | 7/1977 | Leonard et al. | 138/148 |
| 4,219,224 | 8/1980 | Hanley | 138/113 |
| 4,250,927 | 2/1981 | Newburg | 138/113 |
| 4,332,401 | 6/1982 | Stephenson et al. | 285/53 |

FOREIGN PATENT DOCUMENTS

| | | | |
|---|---|---|---|
| 3105406 | 9/1982 | Fed. Rep. of Germany | 138/113 |
| 8301824 | 5/1983 | | |
| 1099748 | 1/1968 | United Kingdom | 138/148 |
| 1316110 | 5/1973 | United Kingdom | 138/113 |

OTHER PUBLICATIONS

Fernwärme International District Heating Chauffage Urbain Distributor: Arbeitsgemeinschaft Fernwärme e.V. bei der WDEW und Union Internationale des Distributeurs de Chaleur-Unichal-D 21297 F, 1, 1980.
3R International, Planung, Bau und Betrieb von Fernwärmeversorgungsnetzen, Oct. 10 1977.

Primary Examiner—Stephen Marcus
Assistant Examiner—Leo Peters
Attorney, Agent, or Firm—Beveridge, DeGrandi & Weilacher

[57] ABSTRACT

The invention relates to a conduit for the transport of liquid and/or gaseous media or suspensions, comprising at least one media pipe and at least one envelope. The media pipe is arranged so as to be axially displaceable inside the envelope or envelopes on sliding parts under formation of an air gap separating the envelope from the media pipe. The sliding parts are held at the joints of the individual elements of the envelope. They preferably extend by a radially outer segment between the elements of the envelope and form a support for the media pipe together with a radially inner segment. A single annular sliding part is preferably inserted in each joint of the elements of the envelope. In the case of an annular sliding part without a segment extending between the elements of the envelope, the part is conveniently pushed outward by self-tensioning due to the elasticity of its shape.

11 Claims, 9 Drawing Figures

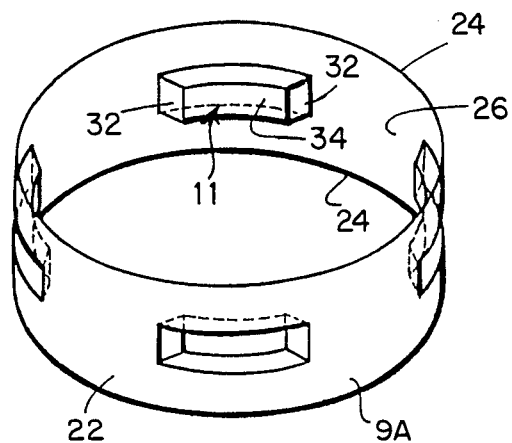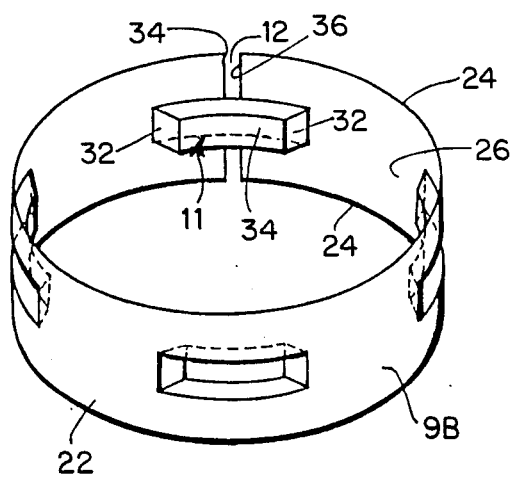

CONDUIT

The invention relates to a conduit for the transport of liquid and/or gaseous media or suspensions, comprising at least one media pipe preferably consisting of metal or plastics and at least one envelope, with the media pipe arranged so as to be axially displaceable inside the envelope or envelopes on sliding parts or members that provide an air gap separating the envelope from the media pipe. The axial displaceability is not essential in the finally placed conduit composed of several elements and not in the individual elements. It is necessary, above all, for the insertion of the media pipe into the inner space of the envelope during the production of the elements of the conduit.

BACKGROUND OF THE INVENTION

Conduits of this type are mainly used for the transport of media requiring thermal insulation or those thermal insulation is useful, such as, for instance, in pipelines for distant heating, coolants or mineral oil. The sliding parts or members prevent thermal bridges between the envelope and the media pipe. The envelope is normally provided with an outer protective pipe, consisting, for instance, of cement containing fibers or asbestos, of concrete, plastics, ceramics material, metal or the like. Connected to the outer protective pipe can be a central inner pipe or several such inner pipes distributed over the cross section of the other protective pipe. The cavity between the outer protective pipe and the inner pipe is filled with an elastic foam of plastics material, preferably polyurethane foam, for instance, whereby a strong envelope with a correctly positioned cavity for receiving the media pipe is formed. The envelope has particularly good thermal insulating properties and an additional thermal insulation is provided by the air gap between the envelope and the media pipe. A conduit of this type is described in the publication WO 83/01824.

The known conduit described there has the disadvantage that the installation of the sliding parts securing the air gap between the media pipe and the envelope is comparatively elaborate. Each sliding part is formed as an individual skid in the shape of an undulating band forming inner and outer supporting surfaces. Several such skids must be distributed in the proper position around the respective cross section of the media pipe and tightened there by means of a common tightening strap on the outer periphery of the media pipe. The tightening of the skids along the supporting surfaces abutting the media pipe moreover results in a certain transfer of heat via the skids.

SUMMARY OF THE INVENTION

It is the object of the invention to provide a conduit in which the air gap between the media pipe and the envelope is secured in a simpler manner. In a conduit of the type initially mentioned, it consists in that the sliding parts of members are held at the joints of the individual elements of the envelope and preferably extend with a radially outer segment between the elements and form a support for the media pipe together with a radially inner segment. By this arrangement of the sliding parts, these are secured against axial displacement and their fastening is essentially simplified. In an envelope provided with a layer of polyurethane foam, they can be formed or inserted in this layer; in an envelope with an inner pipe, they can abut with one shoulder on its end or tightly grip its circumference. Moreover, there is the possibility to shape the sliding parts or members so that they also serve for centering the elements of the envelope abutting at the joints. This is particularly important in conduits having several media pipes arranged eccentrically within the envelope, as the elements of the envelope in this case must abut one another in the proper rotating position.

Preferably, one single annular sliding part or member is inserted at each joint of the elements of the envelope. In this case, the fastening in the proper position on the envelope is particularly simple.

In a conduit having an envelope formed in a manner known per se with a layer of plastics foam projecting over the end of an inner pipe, the annular sliding part preferably encompasses or telescopically receives the ends of the inner pipes.

The sliding parts of the annular sliding parts can consist of various materials, in particular of plastics, having the required sliding properties at the supporting surface of the media pipe.

A very practical embodiment provides for the annular sliding part or member to be formed as a sheet metal sleeve arranged concentrically in relation to the envelope, with the cylindrical portion or jacket of the sleeve placed on or inserted in the ends of the elements of the envelope to be connected and provided in its central or middle zone with radially inwardly extending portions preferably extending between the envelope and the outer surface of the media pipe. In an envelope provided with plastics foam, the sheet metal sleeve is advantageously foamed with one side of its cylindrical portion into the plastics foam of the one element and inserted into the platics foam of the other element with the other side of its jacket. The edge to be inserted can be formed as a cutting edge if necessary.

It is also possible to insert the sheet metal sleeve with the respective side of its jacket or cylindrical portion into annular grooves provided on the joints of the elements.

For forming the punched out or inwardly extending pieces of the sheet metal sleeve, it is of advantage to punch longitudinal cuts into the central zone of their sheet metal strip; the area between the longitudinal cuts can be arched inwardly in bridge shape.

In the case of an annular sliding member without end sections extending between the elements of the envelope, this member can be held in position in part by self-tensioning against the inner surface of the envelope due to the elasticity of its shape. In this case, an arrangement close to the joints of the individual elements will be preferable.

It is also possible to have each of the sliding parts abut flanges of the media pipe, thereby creating fixed points for the envelope along the media pipe.

According to another embodiment, at least two sliding parts are glued spacially to the joint surface of at least one of the abutting elements of the envelope in the lower range of the periphery of the envelope.

BRIEF DESCRIPTION OF THE DRAWINGS

The invention is explained in detail by means of several embodiments of conduits according to the invention shown in the drawings.

DETAILED DESCRIPTION OF THE PREFERRED EMBODIMENT

Figure 1:
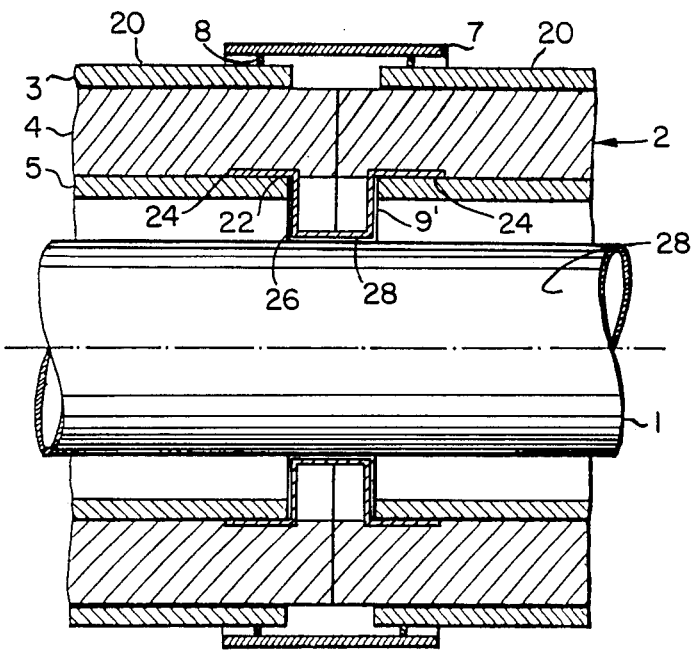
FIGS. 1 to 4 each show an embodiment of the conduit at the joint of the envelope in cross section and FIGS. 5 to 9 each show various embodiments of annular sliding members for securing an air gap between a media pipe and an outer envelope.

In the drawings, the media pipe generally bears the reference numeral 1 and the envelope as a whole bears the reference number 2. The envelope 2 consists in all the cases shown in FIGS. 1 to 4 of an outer protective pipe 3, a plastics foam lyaer 4 and an inner pipe 5. The plastics foam layer 4 projects on the joint ends beyond the ends of the protective pipe 3 and the inner pipe 5. This reliably prevents the forming of a gap between the plastics foam layers 4 in the joint zone which would impair thermal insulation. The gap between the ends of the protective pipes 3 is covered by a bushing 7 abutting the protective pipes 3 via a seal 8. Between the envelope 2 and the media pipe 1, an air gap is formed by means of sliding parts 9.

Each of FIGS. 1-4 shows an arrangement for a conduit for transporting liquids or gases, which conduit includes at least one sliding part or member. The sliding members are identified in FIGS. 1-4 by reference numerals 9', 9'', 9''' and 9'''', respectively. Each of sliding members 9', 9'', 9''' and 9'''' is a single-piece element for providing a joint between two segments 20 of envelope 2.

In FIG. 1, sliding member 9' comprises a cylindrical sleeve 22 having two end or edge sections 24 connected by a middle section 26. End sections 24 telescopically receives an inner pipe 5 of each envelope segment 20 thereunder, whereby the end sections are in turn telescopically received between foam layer 4 of envelope 2. Middle section 26 contacts the exterior wall 28 of media pipe 1 to coaxially position media pipe 1 within envelope 2.

Figure 2:
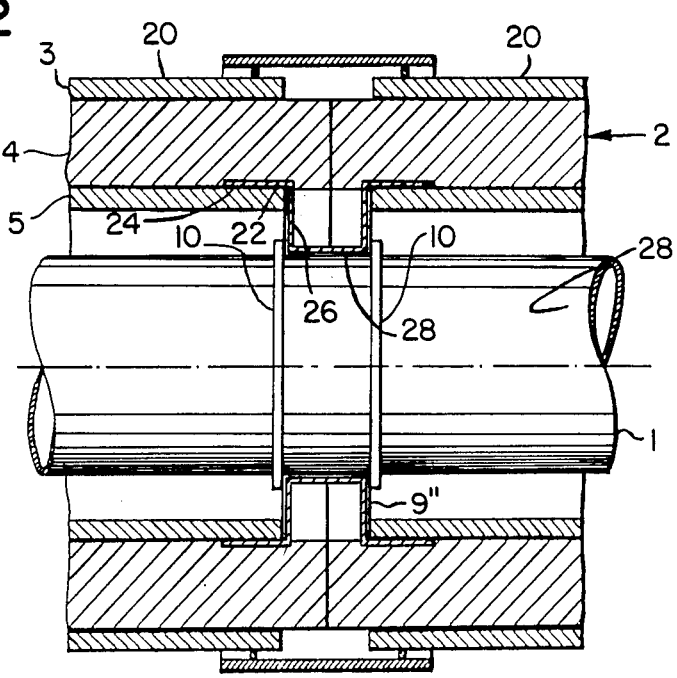

In the embodiment of FIG. 2, media pipe 1 includes annular flanges 10 on the outside wall 28 thereof. Inwardly projecting middle section 26 is received between flanges 10 in an abutting relationship therewith. Otherwise, the embodiments of FIGS. 1 and 2 are the same.

Figure 3:
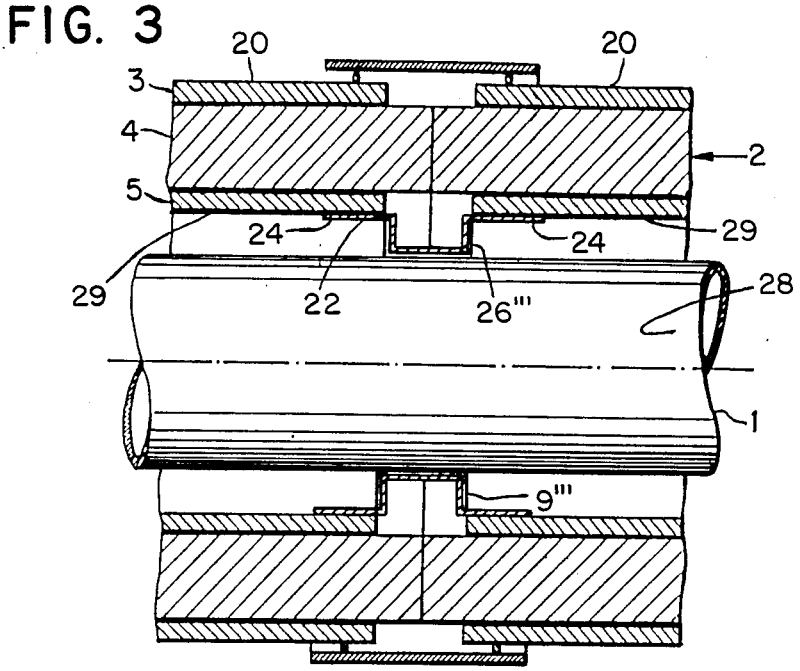

In the embodiment of FIG. 3, middle section 26''' has a radial extension less than middle section 26 of the conduits of FIGS. 1 and 2. Accordingly, end sections 24, coaxial within inner pipes 5, abut against the inner walls of each inner pipe segment. Sliding member 9''' is held in its concentric position with respect to media pipe 1 and inner pipe 5 by inherent spring tension in middle section 26 when compressed between pipes 1 and 5. Thus, sliding member 9''' applies a spring bias against media pipe 1 and envelope inner pipe 5.

Figure 4:
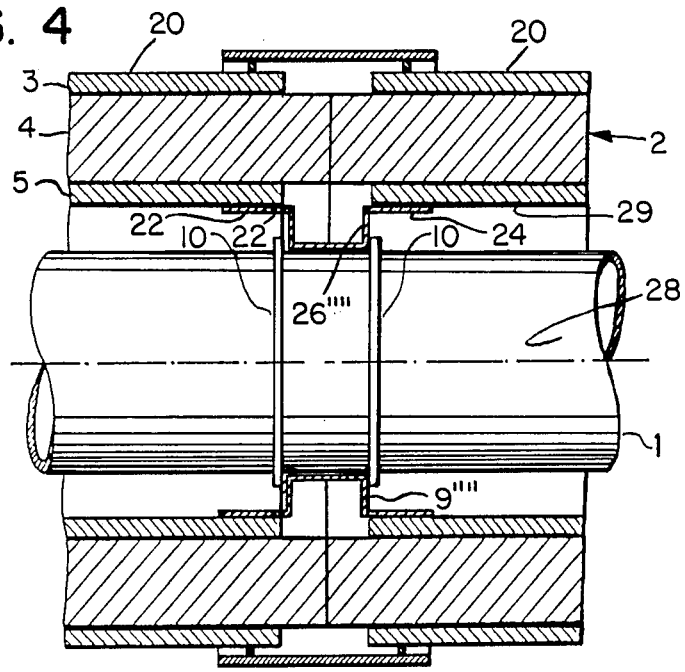

Sliding member 9'''', shown in FIG. 4, has a configuration similar to that of sliding member 9''' in FIG. 3. End section 24'''' of sliding member 9'''' can likewise be biased against inner pipe 5 by spring tension created by the compression of middle section 26''''. Thus, sliding member 9'''' can be of the type shown in FIG. 6. However, since flanges 10 retain member 9'''' in the proper position, member 9'''' can alternatively be of the type shown in greater detail in FIG. 5.

In the embodiments shown in FIGS. 1 and 2, sliding members 9', 9'', having end sections 24 extending into the plastics foam layer 4, can be formed into this one side and inserted into it on the other side.

FIG. 5 is a detailed view in isolation of an annular sliding member 9A formed from a sheet metal sleeve and particularly suited for placement concentrically in relation to the envelope 2. The cylindrical jacket or sleeve 22, according to FIGS. 1 and 2, can be placed onto or inserted into the ends of the elements of the envelope 2 to be connected. In its central zone, sliding member 9A is provided with the punched out pieces or inwardly extending portions 11 bent out of the plane of the jacket or cylindrical sleeve portion. It can be seen that mutually parallel longitudinal cuts are punched in the central zone of the strip-shaped metal sheet of the sheet metal sleeve and that the area between the longitudinal cuts is arched inwardly in bridge shape to form each radially inwardly extending portion. Inwardly extending portions 11 are located in the middle section 26 of sliding member 9A. Each portion 11 has opposing inclined portions 32 connected by an arcuate bridge portion 34 having a curvature similar to that of outer wall 28 of media pipe 1.

FIG. 6 shows an annular sliding part or member 9B similar to member 9A in FIG. 5. Member 9B in FIG. 6, however, due to a slot 12 bridged by the punched out pieces 11 bent out in bridge shape, is elastically deformable under compression and thus is characterized by its elastic spring tension when opposing ends 34 and 36 are urged toward each other. An annular sliding part such as member 9B can be used according to FIGS. 3 and 4.

With reference to FIGS. 5 and 6, it is of advantage to slightly round the edges of the punched out pieces or inwardly extending portions 11 bent in bridge shape so as to avoid sharp edges.

Figure 7:
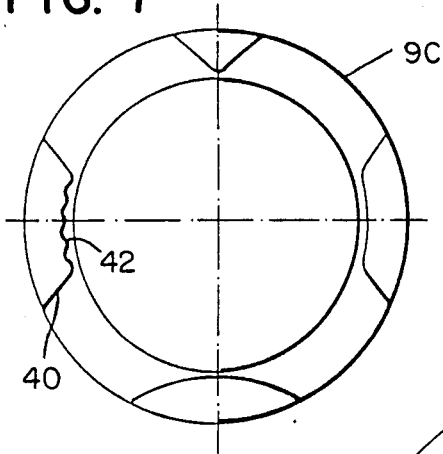

FIG. 7 shows an annular sliding part or member 9C with various shapes of extending portions bent inwardly in bridge shape. Inwardly extending portion 40 has ridges 42.

Figure 8:
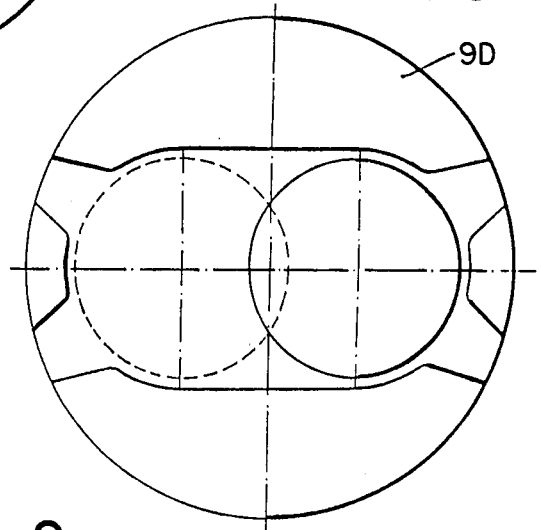

FIG. 8 shows an annular sliding part 9D with supports 44 forming an oval opening 42 for receiving a media pipe 1 and permitting lateral displacement of the pipe.

Figure 9:
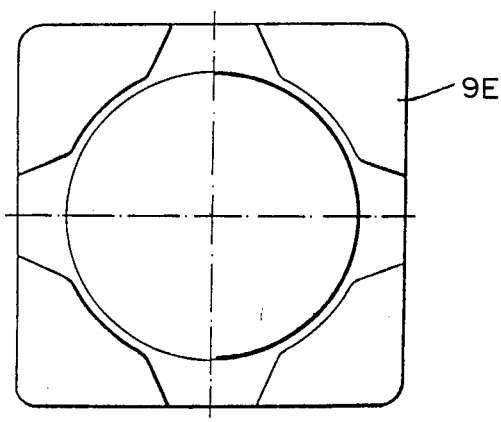

FIG. 9 shows an annular sliding part or member 9E having a rectangular outer contour for use with a square envelope.

Of course all combinations of outer and inner shapes of the annular sliding parts as needed are possible.

I claim:

1. A conduit for transporting a liquid or a gas comprising:

a media pipe providing a conduit for the gas or liquid to be transported;

an envelope coaxially enclosing said media pipe for insulating said pipe, said envelope including a plurality of segments connected together for enclosing and insulating said media pipe; and at least one sliding member coaxially disposed between the inner walls of said envelope and the outer walls of said media pipe, said sliding member being held in abutment between two of said segments and providing an insulating air gap between said inner walls and said outer walls, said at least one sliding member including a cylindrical sleeve having two opposing end sections connected by a middle section, said end sections contacting two of said segments in concentric arrangement therewith, said middle section having a plurality of inwardly extending portions for coaxially engaging said outer walls of said media pipe, each of said inwardly extending portions having inclining portions connected by an arcuate bridge portion, said bridge portion contacting said outer walls of said media pipe.

2. A conduit as claimed in claim 1 wherein each of said segments of said envelope comprises a cylindrical foam layer and an inner pipe coaxial within said foam layer, said inner pipe forming said inner walls, said end sections of said at least one sliding member having a circumference larger than the circumference of said inner pipe, said end sections respectively telescopically receiving said inner pipe of two of said segments.

3. A conduit as claimed in claim 1 wherein each of said segments of said envelope comprises a cylindrical foam layer and an inner pipe coaxial within said foam layer, said inner pipe forming said inner walls, said end sections of said at least one sliding member having a circumference smaller than the circumference of said inner walls, said end sections coaxially abutting said inner walls.

4. A conduit as claimed in claim 3 wherein said sleeve is severed to define two opposing ends, said sleeve being severed over one of said inwardly extending portions, whereby said sleeve is circumferentially compressible by urging said ends towards one another and circumferentially expansible by urging said ends apart.

5. A conduit as claimed in claim 1 wherein said bridge portion comprises ridges.

6. A conduit for transporting a liquid or a gas comprising:
    a media pipe providing a conduit for the gas or liquid to be transported, the outer wall of said media pipe having a pair of annular flanges thereon;
    an envelope coaxially enclosing said media pipe for insulating said pipe, said envelope including a plurality of segments connected together for enclosing and insulating said media pipe; and
    at least one sliding member coaxially disposed between the inner walls of said envelope and the outer walls of said media pipe, said sliding member being held in abutment between two of said segments and providing an insulating air gap between said inner walls and said outer walls, said at least one sliding member including a cylindrical sleeve having two opposing end sections connected by a middle section, said sleeve contacting two of said segments in concentric arrangement therewith, said middle section having a plurality of inwardly extending portions for coaxially engaging said outer walls of said media pipe, each of said inwardly extending portions having inclining portions connected by an arcuate bridge portion, each of said bridge portions contacting said outer walls between said flanges.

7. A conduit as claimed in claim 6 wherein each of said segments of said envelope comprises a cylindrical foam layer and an inner pipe coaxial within said foam layer, said inner pipe forming said inner walls, said end sections of said at least one sliding member having a circumference larger than the circumference of said inner pipe, said end sections respectively telescopically receiving said inner pipe of two of said segments.

8. A conduit as claimed in claim 7 wherein said envelope further comprises an outer pipe, said foam layer being coaxial between said inner pipe and said outer pipe.

9. A conduit as claimed in claim 6 wherein each of said segments of said envelope comprises a cylindrical foam layer and an inner pipe coaxial within said foam layer, said inner pipe forming said inner walls, said end sections of said at least one sliding member having a circumference smaller than the circumference of said inner walls, said end sections coaxially abutting said inner walls.

10. A conduit as claimed in claim 9 wherein said sleeve is severed to define two opposing ends, said sleeve being severed over one of said inwardly extending portions, whereby said sleeve is circumferentially compressible by urging said ends towards one another and circumferentially expansible by urging said ends apart.

11. A conduit as claimed in claim 10 wherein said envelope further comprises an outer pipe, said foam layer being coaxial between said inner pipe and said outer pipe.

* * * * *